United States Patent
Zhang et al.

(10) Patent No.: US 9,312,933 B2
(45) Date of Patent: Apr. 12, 2016

(54) APPARATUS AND METHOD FOR DYNAMICALLY ALTERING A DOWNLINK MIMO CONFIGURATION

(71) Applicant: QUALCOMM Incorporated, San Diego, CA (US)

(72) Inventors: Danlu Zhang, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/185,736

(22) Filed: Feb. 20, 2014

(65) Prior Publication Data
US 2014/0241446 A1     Aug. 28, 2014

Related U.S. Application Data

(60) Provisional application No. 61/768,309, filed on Feb. 22, 2013.

(51) Int. Cl.
*H04B 7/04* (2006.01)
*H04L 1/00* (2006.01)
*H04W 36/30* (2009.01)
(Continued)

(52) U.S. Cl.
CPC ............ *H04B 7/0413* (2013.01); *H04B 7/0417* (2013.01); *H04B 7/063* (2013.01); *H04B 7/0689* (2013.01); *H04B 7/0628* (2013.01); *H04B 7/0632* (2013.01); *H04B 7/0639* (2013.01); *H04B 7/0691* (2013.01);
(Continued)

(58) Field of Classification Search
CPC ... H04W 36/30; H04B 7/0689; H04B 7/0413; H04B 7/0632; H04B 7/0639; H04B 7/0691; H04K 3/226; H04L 1/0006
See application file for complete search history.

(56) References Cited

U.S. PATENT DOCUMENTS

| | | | |
|---|---|---|---|
| 2006/0126752 A1* | 6/2006 | Hansen et al. | 375/267 |
| 2007/0160156 A1* | 7/2007 | Melzer et al. | 375/260 |

(Continued)

FOREIGN PATENT DOCUMENTS

EP     1672824 A2     6/2006

OTHER PUBLICATIONS

International Search Report and Written Opinion—PCT/US2014/017838—ISA/EPO—May 22, 2014.

(Continued)

*Primary Examiner* — Ross Varndell
(74) *Attorney, Agent, or Firm* — Loza & Loza LLP

(57) ABSTRACT

A mobile wireless device may dynamically alter a downlink MIMO function by switching it on and off, or switching between different downlink MIMO configurations, such as 2×MIMO and 4×MIMO. Still further, a mobile device having greater than two antennas may dynamically select a subset of the antennas to be used to receive a MIMO transmission, and further, enable a mobile device to request a subset of antennas at a base station to be used for the MIMO transmission. This dynamic control of the MIMO mode or configuration may be achieved by using implicit signaling, by way of an enlarged code word set in CQI feedback transmissions, or by using explicit signaling, by way of E-DPCCH orders. In this way, a MIMO-capable mobile device may dynamically be configured for downlink MIMO transmissions as the conditions demand, enabling MIMO to be switched off when its use might otherwise cause performance to suffer.

18 Claims, 6 Drawing Sheets

(51) Int. Cl.
   *H04B 7/06*     (2006.01)
   *H04B 7/08*     (2006.01)

(52) U.S. Cl.
   CPC ............ *H04B 7/0874* (2013.01); *H04L 1/0006* (2013.01); *H04W 36/30* (2013.01)

(56) References Cited

U.S. PATENT DOCUMENTS

| | | | |
|---|---|---|---|
| 2008/0113633 A1* | 5/2008 | So | 455/101 |
| 2009/0086648 A1 | 4/2009 | Xu et al. | |
| 2010/0260147 A1* | 10/2010 | Xing et al. | 370/332 |
| 2012/0112970 A1* | 5/2012 | Caballero et al. | 343/702 |
| 2012/0287869 A1* | 11/2012 | Xi et al. | 370/329 |

OTHER PUBLICATIONS

Nortel., "Adaptive MIMO modes", 3GPP Draft, R1-051424, Mobile Competence Centre,650, Route Des Lucioles, F-06921 Sophia-Antipolis Cedex France, Nov. 1, 2005, vol. RAN WG1, no. Seoul, Korea, XP050101015, pp. 1-11. [retrieved on Nov. 1, 2005] the whole document.

Zte., "Considerations on energy saving for 1-30 UTRAN", 3GPP Draft; R3-101549 Considerations on Energy Saving for UTRAN, 3rd Generation Partnership Project (3GPP), Mobile Competence Centre , 650, Route Des Lucioles, F-06921 Sophia-Antipolis Cedex, France, vol. RAN WG3, no. Montreal, Canada, May 10, 2010, XP050425304, pp. 1-4. [retrieved on May 1, 2010] the whole document.

* cited by examiner

APPARATUS AND METHOD FOR DYNAMICALLY ALTERING A DOWNLINK MIMO CONFIGURATION

CLAIM OF PRIORITY UNDER 35 U.S.C. §119

The present application for patent claims priority to Provisional Application No. 61/768,309, filed Feb. 22, 2013, and assigned to the assignee hereof and hereby expressly incorporated by reference herein.

TECHNICAL FIELD

Aspects of the present disclosure relate generally to wireless communication systems, and more particularly, to multiple-antenna transmission technologies such as those configured for MIMO and beamforming.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP).

One of the more recent enhancements made available in a UTRAN relates to multi-antenna technology, where multiple transmit antennas and/or multiple receive antennas can be used in a wireless link to enhance data transmission performance, enabling diversity gains to reduce multipath fading and increase transmission quality, as well as spatial multiplexing gains to increase data throughput.

Spatial multiplexing may be used to transmit different streams of data simultaneously on the same frequency. The data steams may be transmitted to a single receiving device to increase the data rate, or to multiple receiving devices to increase the overall system capacity. This is achieved by spatially precoding each data stream, and then transmitting each spatially precoded stream through a different transmit antenna. The spatially precoded data streams arrive at the receiving devices with different spatial signatures, which enables each of the receiving devices to recover the one or more the data streams destined for that device.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. For example, for downlink transmissions, to achieve good coverage at the edges of the cell, a single stream beamforming transmission may be used in combination with transmit diversity.

Within the field, the term MIMO (multi-input, multi-output) is frequently used to refer to spatial multiplexing, while beamforming, which is another multiple antenna technology, might be excluded from the conventional definition of MIMO. However, within the present document, the term MIMO is used broadly to refer to all such multi-antenna technologies, not only including spatial multiplexing, but also including beamforming.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure enable a mobile wireless device to dynamically switch on and off a downlink MIMO function. Further aspects of the disclosure enable the mobile device to dynamically switch between different downlink MIMO modes or configurations, such as beamforming, 2×MIMO, and 4×MIMO. Still further aspects of the disclosure enable a UE having greater than two antennas to dynamically select a specific subset of the antennas to be used to receive a downlink MIMO transmission, and further, enable a UE to request a specific subset of antennas at a base station to be used for transmitting the downlink MIMO transmission. This dynamic control of the downlink MIMO mode or configuration may be achieved by using implicit signaling, by way of an enlarged code word set in CQI feedback transmissions, or by using explicit signaling, by way of E-DPCCH orders. In this way, a MIMO-capable mobile device may be dynamically configured for downlink MIMO transmissions as the conditions demand, enabling MIMO to be switched off when its use might otherwise cause performance to suffer.

In one aspect, the disclosure provides a method of wireless communication operable at a user equipment (UE). The method includes transmitting a request to alter a first multi-input multi-output (MIMO) configuration of a downlink transmission, and receiving the downlink transmission based on a second MIMO configuration corresponding to the request.

Another aspect of the disclosure provides a UE configured for wireless communication, including at least one processor, a memory communicatively coupled to the at least one processor, and a transceiver communicatively coupled to the at least one processor. Here, the at least one processor is configured to transmit a request to alter a first multi-input multi-output (MIMO) configuration of a downlink transmission, and to receive the downlink transmission based on a second MIMO configuration corresponding to the request.

Another aspect of the disclosure provides a UE configured for wireless communication, including means for transmitting a request to alter a first multi-input multi-output (MIMO) configuration of a downlink transmission, and means for receiving the downlink transmission based on a second MIMO configuration corresponding to the request.

Another aspect of the disclosure provides a computer-readable storage medium having instructions for causing a computer to transmit a request to alter a first multi-input multi-output (MIMO) configuration of a downlink transmission, and to receive the downlink transmission based on a second MIMO configuration corresponding to the request.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
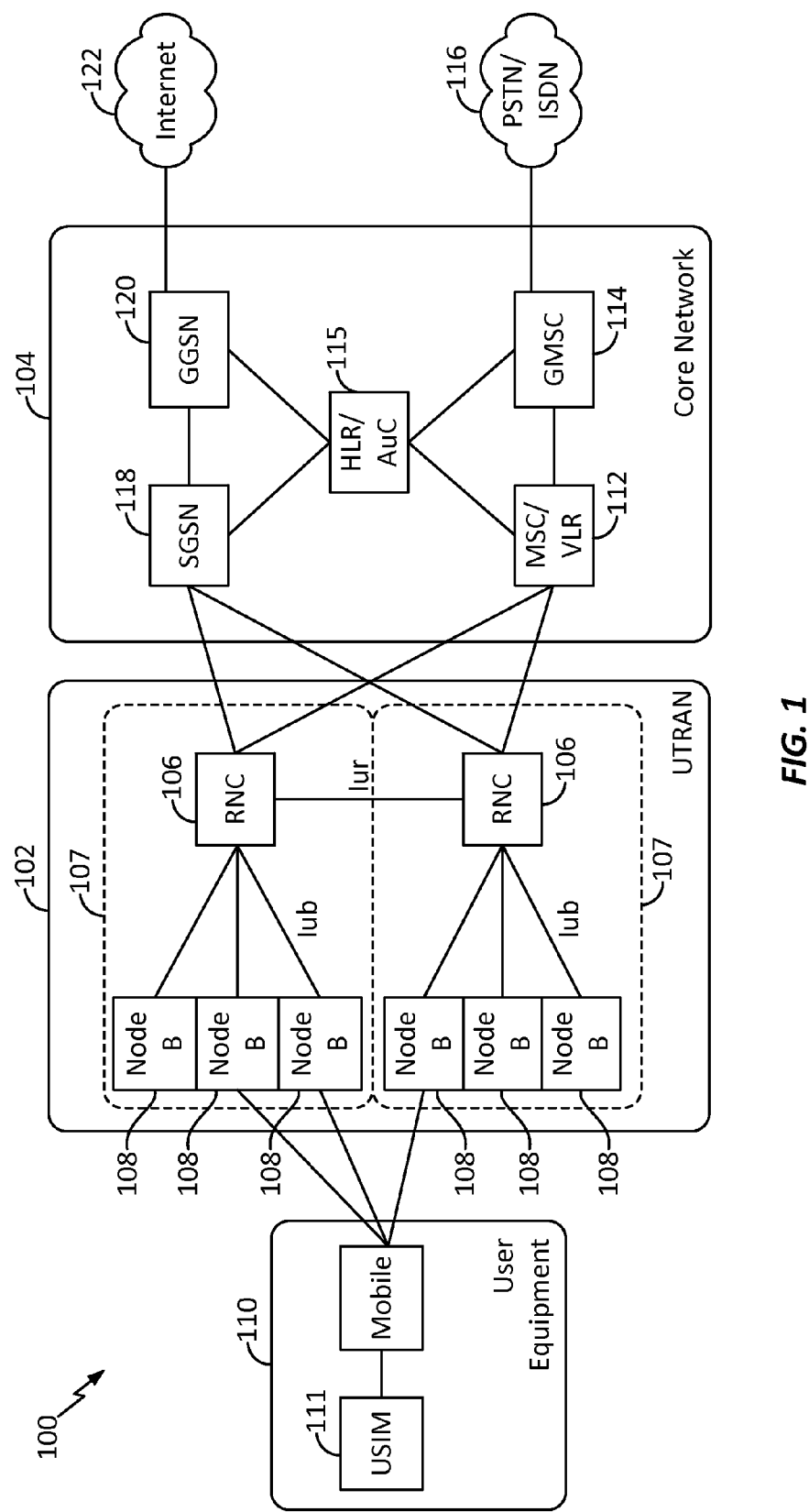
FIG. 1 is a block diagram conceptually illustrating an example of a telecommunications system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a Universal Mobile Telecommunications System (UMTS) system 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111, which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 102 is based on such DS-CDMA technology and additionally calls for a frequency division duplexing (FDD). FDD uses a different carrier frequency for the uplink (UL) and downlink (DL) between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

Figure 2:
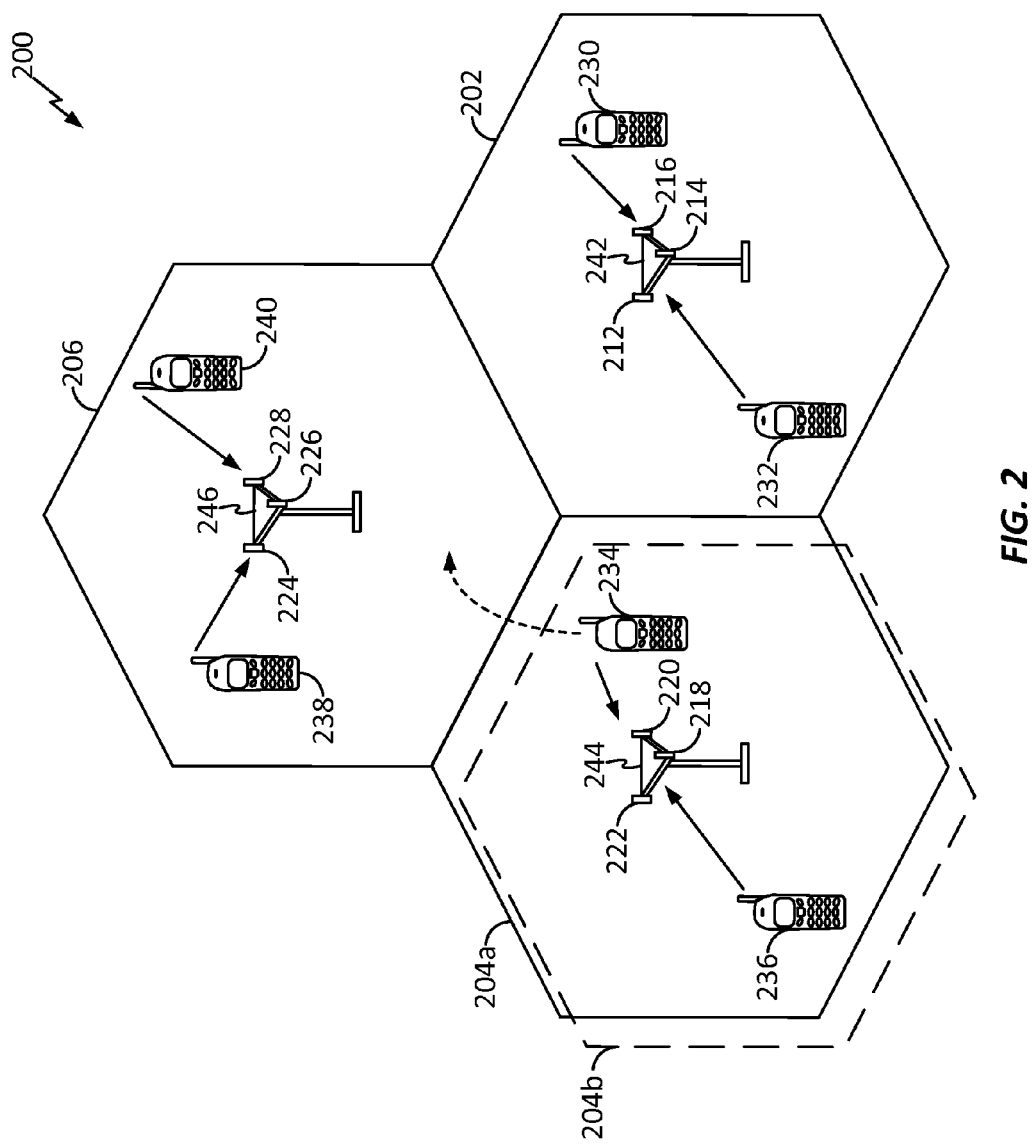
FIG. 2 is a conceptual diagram illustrating an example of an access network.

The UTRAN 102 is one example of a RAN that may be utilized in accordance with the present disclosure. Referring to FIG. 2, by way of example and without limitation, a simplified schematic illustration of a RAN 200 in a UTRAN architecture is illustrated. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, cell 204a may utilize a first scrambling code, and cell 204b, while in the same geographic region and served by the same Node B 244, may be distinguished by utilizing a second scrambling code.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 104 (see FIG. 1) for all the UEs 230, 232, 234, 236, 238, and 240 in the respective cells 202, 204, and 206.

As described further below, one or more of the sectors in the RAN 200 may utilize any number of carriers in the downlink direction, and this number of carriers may be the same or different from the number of carriers in the uplink direction. Furthermore, one or more of the sectors in the RAN 200 may utilize multi-antenna technology, such as beamforming and/or MIMO.

A high speed packet access (HSPA) air interface includes a series of enhancements to the 3G/W-CDMA air interface between the UE 110 and the UTRAN 102/200, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 110 and the core network 104 (referring to FIG. 1), and may include circuit switched and packet switched protocols. The AS provides the lower layers, for signaling between the UTRAN 102 and the UE 110, and may include a user plane and a control plane. Here, the user plane or data plane carries user traffic, while the control plane carries control information (i.e., signaling).

Figure 3:
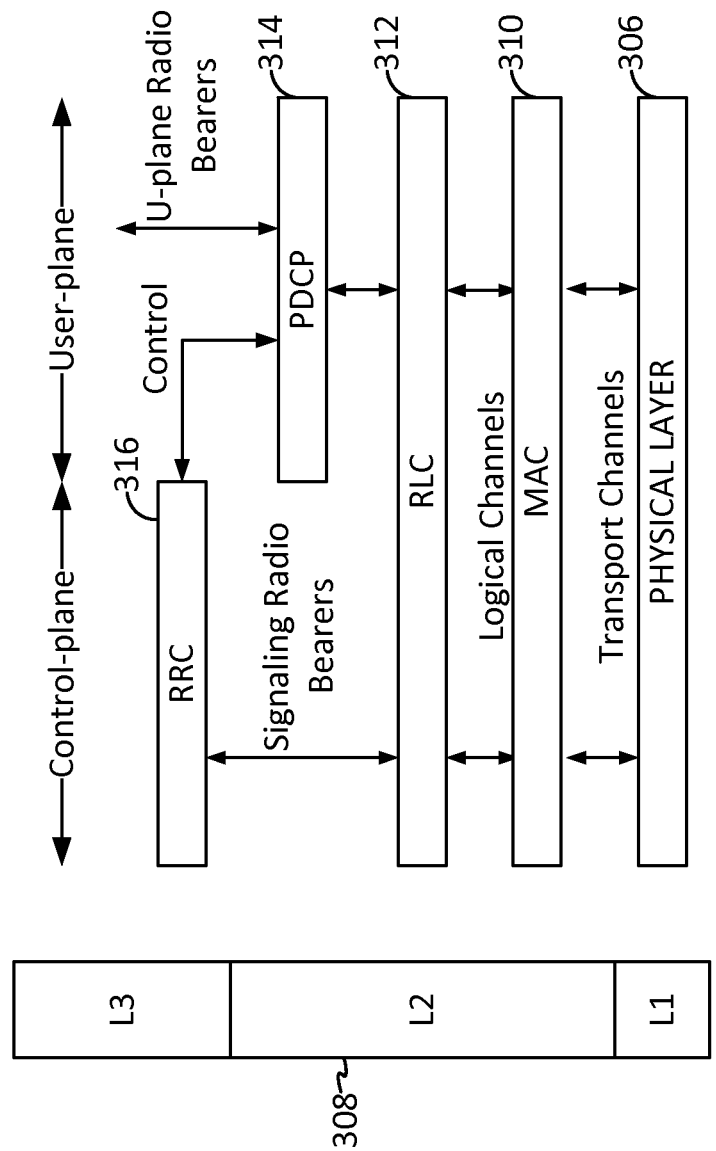
FIG. 3 is a conceptual diagram illustrating an example of a radio protocol architecture for the user and control plane.

Turning to FIG. 3, the AS from the standpoint of the UE 110, when configured for HSPA, is shown with three layers: Layer 1, Layer 2, and Layer 3. Layer 1 is the lowest layer and implements various physical layer signal processing functions. Layer 1 will be referred to herein as the physical layer 306. The data link layer, called Layer 2 308, is above the physical layer 306 and is responsible for the link between the UE 110 and Node B 108 over the physical layer 306.

At Layer 3, the radio resource control (RRC) layer 316 handles the control plane signaling between the UE 110 and the Node B 108. RRC layer 316 includes a number of functional entities for routing higher layer messages, handling broadcasting and paging functions, establishing and configuring radio bearers, etc. As will be described further below, RRC messages may be signaled between the UE 110 and the UTRAN 102 to indicate and acknowledge UE capabilities, including but not limited to a UE capability to request an alteration of a downlink MIMO configuration.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

Many aspects of the HSPA air interface have continued to evolve over time as additional enhancements and features become available, and as technology allows. For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI), precoding control information (PCI), and a positive or negative acknowledgement (ACK/NAK) of a previous HS-DSCH transmission. Here, the CQI is used to indicate the maximum transport block size, modulation type, and number of parallel codes that could be received correctly with a reasonable block error rate, while the PCI is used to provide a precoding vector for downlink MIMO transmissions.

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions. In the present disclosure, the DPCCH may be referred to as a control channel (e.g., a primary control channel) or a pilot channel (e.g., a primary pilot channel) in accordance with whether reference is being made to the channel's control aspects or its pilot aspects.

The E-DCH is implemented by physical channels including the E-DCH Dedicated Physical Data Channel (E-DPDCH), which carries the high-speed uplink data for the E-DCH, and the E-DCH Dedicated Physical Control Channel (E-DPCCH), which carries control information associated with the E-DCH. In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

Release 7 of the 3GPP standards introduced various enhancements to the downlink, one of which includes the implementation of multiple-input, multiple-output (MIMO). MIMO is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 110 to increase the data rate or to multiple UEs 110 to increase the overall system capacity. This is achieved by spatially precoding each data stream and then transmitting each spatially precoded stream through a different transmit antenna on the downlink. The spatially precoded data streams arrive at the UE(s) 110 with different spatial signatures, which enables each of the UE(s) 110 to recover the one or more the data streams destined for that UE 110. On the uplink, each UE 110 may transmit one or more spatially precoded data streams, which enables the Node B 108 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Release 8 of the 3GPP standards introduced dual carrier HSDPA (DC-HSDPA), which enables a UE 110 to aggregate dual adjacent 5-MHz downlink carriers transmitted by a Node B 108. The dual carrier approach provides higher downlink data rates and better efficiency at multicarrier sites. Generally, DC-HSDPA utilizes a primary carrier and a secondary carrier, where the primary carrier provides the channels for downlink data transmission and the channels for uplink data transmission and the secondary carrier provides a second set of HS-PDSCHs and HS-SCCHs for downlink communication. Here, the primary carrier is generally the best serving HS-DSCH cell according to the UE measurements of $E_c/I_0$.

Figure 4:
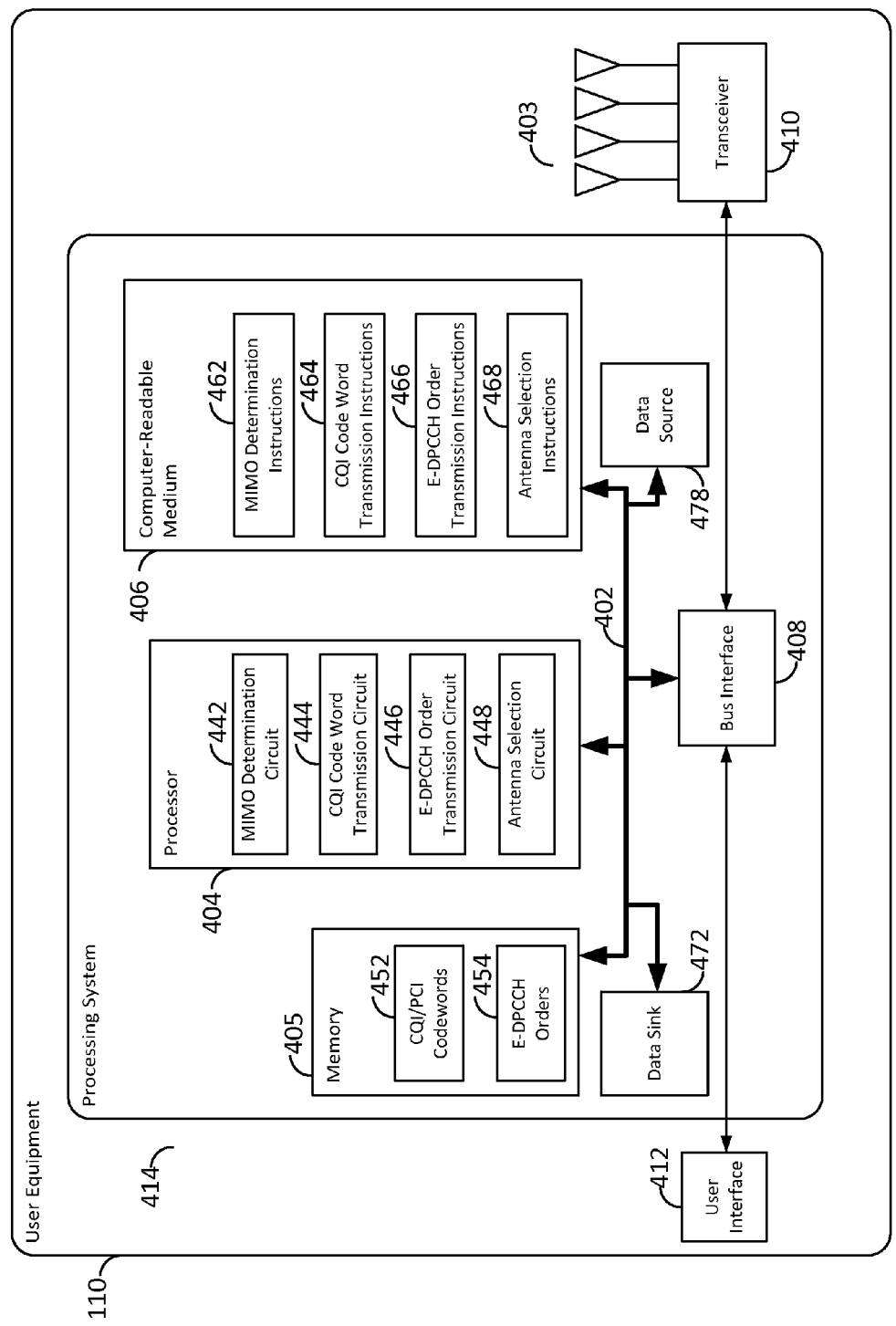
FIG. 4 is a block diagram illustrating an example of a hardware implementation for a user equipment (UE) employing a processing system.

FIG. 4 is a conceptual diagram illustrating an example of a hardware implementation for an apparatus (e.g., the UE 110) employing a processing system 414. In accordance with various aspects of the disclosure, an element, or any portion of an element, or any combination of elements may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. The transceiver 410 may include any suitable number of antennas 403. In some examples, a UE 110 configured for downlink 2×MIMO may include two or more antennas 403. In some examples, a UE 110 configured for downlink 4×MIMO may include four or more antennas 403. Still further, in some examples, the transceiver 410 may include any suitable number of receive chains or receive circuits, and may be configured to receive any suitable number of downlink carriers. As one nonlimiting example, the transceiver 410 may include two receive circuits, and may be configured for DC-HSDPA. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software.

A receiver of the transceiver 410 receives downlink transmissions through one or more antennas 403 and processes the transmission to recover the information modulated onto the carrier. The information recovered by the transceiver 410 is provided to the processor 404. The processor 404 descrambles and despreads the symbols, and determines the most likely signal constellation points transmitted by the Node B 108 based on the modulation scheme. These soft decisions may be based on channel estimates computed by the processor 404. The soft decisions are then decoded and deinterleaved to recover the data, control, and reference signals. The cyclic redundancy check (CRC) codes are then checked to determine whether the frames were successfully decoded. The data carried by the successfully decoded frames will then be provided to a data sink 472, which represents applications running in the UE 110 and/or various user interfaces 412 (e.g., a display). Control signals carried by successfully decoded frames will be provided to the processor 404. When frames are unsuccessfully decoded, the processor 404 may also use an acknowledgement (ACK) and/or negative acknowledgement (NACK) protocol to support retransmission requests for those frames.

In the uplink, data from a data source 478 and control signals from the processor 404 are provided. The data source 478 may represent applications running in the UE 110 and various user interfaces 412 (e.g., a keyboard). Similar to the functionality described in connection with the downlink transmission by the Node B 108, the processor 404 provides various signal processing functions including CRC codes, coding and interleaving to facilitate forward error correction, mapping to signal constellations, spreading with OVSFs, and scrambling to produce a series of symbols. Channel estimates, derived by the processor 404 from a reference signal transmitted by the Node B 108 or from feedback contained in a midamble transmitted by the Node B 108, may be used to select the appropriate coding, modulation, spreading, and/or scrambling schemes. The symbols produced by the processor 404 will be utilized to create a frame structure. The processor 404 creates this frame structure by multiplexing the symbols with additional information, resulting in a series of frames. The frames are then provided to a transmitter of the transceiver 410, which provides various signal conditioning functions including amplification, filtering, and modulating the frames onto a carrier for uplink transmission over the wireless medium through the one or more antennas 403.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

As indicated above, although those of ordinary skill in the art may comprehend the terms MIMO and beamforming generally as referring to different multi-antenna techniques, within the present disclosure, the term "MIMO" is utilized broadly, and is intended to include both MIMO and beamforming techniques. On the other hand, within the present disclosure, "non-MIMO" refers to single antenna technology. While MIMO may be utilized on both uplink and downlink transmission streams, as will be described in further detail below, various aspects of the disclosure relate to downlink MIMO.

Further, within the present disclosure, a simplified notation may be understood to denote the number of antennas used at the UE 110 to receive the downlink MIMO transmissions. For example, non-MIMO indicates that a single receive antenna at the UE 110 receives downlink transmissions; 2×MIMO indicates that two antennas at the UE 110 receive downlink transmissions; and 4×MIMO indicates that four antennas at the UE 110 receive downlink transmissions.

In various technologies in which it may be used (including but not limited to HSDPA), conventional MIMO, including beamforming, may provide substantial throughput gain, especially when the channel is slow-varying. However, MIMO might not offer such advantages in all situations. For example, for any MIMO transmission, there exists in general a phase offset between the transmissions on the different antennas. In order for the MIMO transmission to be properly received, this phase offset is a parameter that generally must be estimated. However, the phase offset can be very sensitive to the movement of the UE. That is, when the UE is moving very quickly, it can become difficult for the UE to keep track of the actual phase offset between the transmit antennas, and when error in this estimation is introduced, the throughput performance can suffer. Thus, in an aspect of the disclosure, in scenarios, such as during fast movement of the UE, where the phase offset becomes difficult to estimate, it may be advantageous for the UE 110 to be enabled to turn off the MIMO mode of downlink transmission.

Furthermore, during normal use of a mobile device, different handling of the device or different environmental conditions can result in an imbalance where different signal strength is achieved at each of the antennas at the mobile device. For example, if the multi-antenna UE 110 is a handheld device, the user's hand may block one or more of the antennas. Such blocking of one or more antennas may be referred to as shadowing. If one or more of the antennas are blocked, it may be better in terms of performance and/or throughput to concentrate all of the signal energy at an unblocked antenna, rather than splitting the signal energy among two or more antennas.

These high-speed UE conditions, channel varying conditions, and antenna imbalance conditions, are merely exemplary in nature, however. In accordance with various aspects of the present disclosure, any suitable reason may result in a determination that a MIMO mode of operation may be undesirable at the UE 110. That is, the UE 110 (e.g., utilizing a MIMO determination circuit 442 and/or MIMO determination instructions 462) may monitor any of one or more parameters, such as the UE speed, the received power, signal-to-noise ratio, bit error rate, throughput etc., at one or more of the UE's antennas 403, to be used in a determination as to whether improvements may be achieved by the use of MIMO relative to single-antenna performance. Similarly, these parameters may be utilized in a determination as to whether one MIMO mode, such as 2×MIMO, may be preferable over another MIMO mode, such as 4×MIMO. That is, in a UE 110 that is capable of operating in a 4×MIMO mode and a 2×MIMO mode, various different scenarios may result in 4×MIMO failing to provide any gains relative to 2×MIMO, and as such, the UE 110 may determine to alter the MIMO configuration from 4×MIMO to 2×MIMO.

However, even if these problematic conditions are known to exist, in a conventional UMTS downlink configured for HSDPA with MIMO, there is no simple way for the UE 110 to dynamically turn MIMO, including beamforming, on and off. Similarly, there is no conventional means for the UE 110 to switch between 4×MIMO and 2×MIMO.

According to certain approaches, downlink MIMO is controlled by the UTRAN 102 by way of RRC signaling, which is somewhat static, or very slow. That is, referring to FIG. 1, the RNC 106 typically does not have instantaneous or recently updated information from the UE 110 with regard to the state of the radio link between the UE 110 and a Node B 108. The time involved for messaging this information to the RNC 106, and to accordingly change the state of the MIMO configuration utilizing RRC signaling, may be too slow when conditions vary relatively quickly. Moreover, even if the Node B 108, which maintains the air interface, did have a way to switch on and off MIMO, or to change its configuration, there would remain certain round trip time delays, as well as processing time, before the Node B 108 could relay a decision with respect to the MIMO configuration back to the UE 110.

Therefore, one or more aspects of the present disclosure provide for the UE 110 to dynamically switch downlink MIMO on and off, and/or to switch between different MIMO configurations, including but not limited to single stream beamforming, 4×mimo, and 2×MIMO. Here, when referring to switching MIMO on or off, it is broadly intended to refer to the switching between a transmission with MIMO or beamforming, and transmission without MIMO or beamforming (e.g., single-antenna downlink transmission).

In some examples, the dynamic switching described herein may be achieved by utilizing a scheme that is outside the scope of the UMTS standards, but without violating the UMTS standards. That is, if both the UE 110 and the Node B 108 can agree and utilize a particular signaling scheme to control the MIMO configuration, this agreed scheme may be implemented without requiring UMTS standards to dictate the messaging format. However, in other examples, dynamic control of the MIMO configuration may be achieved with standards support, which may be in the form of standard-defined RRC signaling. By utilizing standards, it can be ensured that all vendors who deploy technology under the standards can enable such dynamic control of the MIMO configuration on all UEs and networks.

By utilizing one or more aspects of the disclosure, a MIMO-capable UE 110 may be configured by the network to receive a downlink MIMO transmission in a static way, without losing performance during dynamically changing situations, since the UE 110 may include a capability to dynamically switch off downlink MIMO (including beamforming), or to switch from 4× to 2× in another example, in adverse situations.

In the description that follows, two particular examples for dynamic control of a MIMO configuration are described, As one example, an enlarged codeword set for CQI/PCI reporting may be utilized to indicate instructions to control the MIMO configuration. As another example, E-DPCCH orders may be utilized to indicate instructions to control the MIMO configuration.

CQI/PCI Codewords

As described above, the HS-DPCCH is an uplink physical channel transmitted by the UE, carrying certain feedback information typically used to improve downlink transmissions in HSDPA. Among this information is included CQI/PCI feedback relating to downlink transmissions on the HS-PDSCH, as well as an ACK/NACK for the HARQ function. The ACK/NACK is generally indicated in a first part of the HS-DPCCH, with a given number of bits of information, while the CQI/PCI reporting utilizes a given number of bits and, in some cases, padding, with a bit pattern (codeword) utilized to represent a particular CQI/PCI value. The Node B 108 that receives the HS-DPCCH has a set of hypotheses for the codeword used, and when decoding the report, matches the transmission with one of the hypotheses to determine the CQI/PCI report.

In a UE configured for downlink 2×MIMO according to certain approaches for HSDPA, the CQI/PCI report can request one of two types of transmissions from the Node B. For example, the UE may request a downlink MIMO transmission utilizing two streams, with two possible beamforming vectors. Further, the UE may request a downlink MIMO transmission utilizing one stream, with one of four possible beamforming vectors. However, once configured for downlink MIMO, such a UE is not capable of requesting a transmission without MIMO or beamforming. That is, all options available to such a UE involve splitting the downlink transmission power between different antennas; such a UE lacks a capability to request a downlink transmission without MIMO or beamforming.

Similarly, in a UE configured for 4×MIMO according to certain approaches for HSDPA, the MIMO configuration is static, indicating one of non-MIMO, single-stream beamforming, 2×MIMO, or 4×MIMO. In this case, in much the same way as with 2×MIMO, the UE may be moving quickly, or one or more of the antennas may be blocked. Therefore, a means for the UE to dynamically request an alteration of the downlink MIMO configuration may be desired to avoid issues that may arise with a fast-moving UE, or a UE with one or more blocked/shadowed antennas.

Therefore, in accordance with an aspect of the present disclosure, an enlarged CQI/PCI codeword set may be provided, wherein the CQI/PCI codeword set includes one or more codewords configured to enable the UE 110 to transmit a request to alter a downlink MIMO configuration, e.g., to turn on or off the MIMO downlink transmission at the Node B 108, or to switch between MIMO configurations (e.g., single stream beamforming, 2×MIMO, and 4×MIMO). As one example, the UE 110 may include a CQI/PCI codeword transmission circuit 444 and/or CQI/PCI codeword transmission instructions 464 configured to utilize the transceiver 410 to transmit a selected CQI/PCI codeword, which may be selected from a listing of CQI/PCI codewords 452 stored in memory 405.

The set of CQI/PCI codewords utilized to alter the downlink MIMO configuration (e.g., stored in the listing of CQI/PCI codewords 452) may take several different forms within the scope of the present disclosure. For example, one codeword may be used to indicate turning off MIMO, while another codeword may be used to indicate turning on MIMO. In another example, a single codeword may be used to toggle between an on and off configuration. In still another example, each utilized CQI/PCI codeword may represent a desired MIMO configuration (e.g., no MIMO, single stream beamforming, 2×MIMO, 4×MIMO).

Here, the Node B 108 may additionally be configured to decode one or more codewords utilized by the UE 110 as possible hypotheses, wherein the codewords are configured for altering the downlink MIMO configuration, e.g., by turning on or off the MIMO transmission, or to switch between MIMO configurations (e.g., single stream beamforming, 2×MIMO, and 4×MIMO).

That is, the memory 405 at the UE 110 may be configured to include a set of CQI/PCI codewords 452 configured to encode not only conventional feedback, relating to the CQI/PCI, but in addition, in some aspects of the disclosure, to encode one or more requests/instructions/information elements (IE) from the UE 110 to alter a MIMO configuration, e.g., to turn MIMO on or off, or to switch between MIMO configurations (e.g., single stream beamforming, 2×MIMO, and 4×MIMO). In some examples, the codeword set may include a legacy set of codewords, which the a conventional UE may utilize, and further, the codeword set may include a second set of codewords, which the UE 110 configured according to some aspects of the present disclosure may choose from for altering the MIMO configuration, e.g., turning on/off the MIMO downlink transmission, and/or to switch between MIMO configurations (e.g., single stream beamforming, 2×MIMO, and 4×MIMO).

At the Node B 108, this second set of codewords may correspond to a set of hypotheses for the decoding of the HS-DPCCH. As one example, the set of hypotheses may include three hypotheses: one hypothesis corresponding to a non-MIMO transmission, wherein the downlink transmission (e.g., corresponding to the HS-DPDCH) includes all energy on a single antenna transmission; a second hypothesis corresponding to a single-stream MIMO transmission (e.g., for downlink beamforming); and a third hypothesis corresponding to a dual-stream MIMO transmission (e.g., for 2×MIMO spatial multiplexing). In another example, the set of hypotheses may additionally include a fourth hypothesis, corresponding to a four-stream MIMO transmission (e.g., for 4×MIMO spatial multiplexing).

When the Node B 108 receives the HS-DPCCH transmission and decodes the CQI/PCI, it can accordingly determine whether the UE 110 desires MIMO, and the desired MIMO configuration (e.g., non-MIMO, single stream beamforming, 2×MIMO, or 4×MIMO). Because such feedback transmissions may be transmitted as frequently as every 2 ms in UMTS, this aspect of the disclosure can offer a relatively fast way for the UE 110 to control the downlink MIMO configuration.

By utilizing this scheme, the UE 110 may decide, based on any suitable factors or parameters, the best downlink MIMO configuration to choose. For example, the UE 110 may utilize a MIMO determination circuit 442, and/or MIMO determination instructions 462, to determine one or more factors or parameters relating to the downlink MIMO configuration. For example, such factors or parameters for determining a desired MIMO configuration may include, but are not limited to, observations of the channel, observations of signal strength or data errors at one or more of the antennas 403, etc. That is, as indicated above, the use of MIMO may be ill advised when the UE 110 is fast-moving, and accordingly, the MIMO determination circuit 442 and/or MIMO determination instructions 462 may determine, in accordance with information relating to the speed or velocity of the UE 110, to turn off the downlink MIMO configuration. Furthermore, as indicated above, a 2×MIMO configuration, or even a beamforming configuration, may be ill advised if one of two receive antennas 403 is blocked. Similarly, a 4×MIMO configuration may be ill advised if any of one or more of four receive antennas 403 is blocked. Thus, the MIMO determination circuit 442 may determine, in accordance with a detection that one or more antennas is blocked, to alter a MIMO configuration (e.g., to downgrade from 4×MIMO to 2×MIMO or to beamforming, or to downgrade from 2×MIMO to beamforming, or to end a MIMO configuration and request non-MIMO transmissions.

That is, based on any suitable observations/factors/parameters, the UE 110 may determine a desired MIMO configuration, or determine a change in a MIMO configuration, and accordingly select a corresponding CQI/PCI codeword from a stored listing of CQI/PCI codewords 452 in the memory 405, for a subsequent HS-DPCCH transmission. In this way, the Node B 108 may determine how to construct a packet for a downlink transmission.

In a further aspect of the disclosure, in order to maintain the reliability of decoding the HS-DPCCH transmission at the Node B 108, the UE 110 may be configured to increase a power of the HS-DPCCH transmission, e.g., by increasing a carrier-to-pilot (C2P) power ratio. That is, due to the possible increase in the number of codewords that may be included in the CQI/PCI codeword set, if the power were not increased, the reliability of decoding the CQI/PCI transmission may be reduced. Thus, by increasing the power of the HS-DPCCH transmission, its decoding reliability may be maintained.

As indicated above, the implementation of this scheme for allowing the UE 110 to transmit downlink MIMO configuration information may or may not be implemented in the standards for UMTS. That is, in some examples, the utilization of the added codewords in the CQI/PCI codeword set need not require any change to the standards published for an access network that utilizes HSDPA. Here, while the UE 110 may be configured to include the expanded code set, and the Node B 108 may be configured to add the additional code words in the expanded code set as a possible hypotheses, and to interpret these code words as a request to shut off MIMO, these changes may be transparent to the higher layers, and need not affect the signaling that corresponds to existing 3GPP standards. In other aspects of the disclosure, wherein the standards do include this scheme, one or more changes to an RRC protocol may be implemented to support the MIMO control functionality utilizing the expanded CQI/PCI codeword set. For example, in some aspects of the disclosure, an information element (IE) may be included in one or more existing RRC messages, or in one or more new RRC messages, configured to indicate that the UE 110 has the capability to signal both MIMO and non-MIMO CQIs while the UE 110 is in a MIMO mode. In response, the network may acknowledge this message, to indicate that it is prepared to decode. Once this agreement is in place, the enlarged codeword set may be utilized by the UE 110.

E-DPCCH Order

In accordance with a further aspect of the disclosure, the UE 110 may be configured to transmit an E-DPCCH order that includes a request to turn on or off the MIMO transmission.

As described above, in relation to enhanced uplink (EUL), or HSUPA, the E-DPCCH carries control information in uplink transmissions from the UE 110, corresponding to high-speed transmissions on the E-DPDCH. Specifically, the E-DPCCH carries information about the E-DPDCH data rate/packet format, information to indicate whether a packet on the E-DPDCH is a retransmission, and a happy bit indicating whether the UE 110 can increase its data rate. Generally, if there is no data transmitted on the E-DPDCH, then the E-DPCCH is not transmitted either.

In the portion of the E-DPCCH that relates to the E-DPDCH data rate/packet format, according to the standards for UMTS, there exist a number of E-DPCCH codewords that are disallowed. That is, certain E-DPDCH packet formats that were previously allowable on EUL transmissions were found to be poorly designed, in terms of coding performance. Thus, these packet formats are indicated not to be used in the specifications for UMTS networks. In accordance with an aspect of the present disclosure, however, the E-DPCCH codewords that represented these unused packet formats may be repurposed as E-DPCCH orders, or signaling to represent the UE's desire to alter the downlink MIMO configuration (e.g., to request switching between non-MIMO, single stream beamforming, 2×MIMO, and 4×MIMO). As one example, the UE 110 may include an E-DPCCH order transmission circuit 446 and/or E-DPCCH order transmission instructions 466 configured to utilize the transceiver 410 to transmit a selected E-DPCCH order, which may be selected from a listing of E-DPCCH orders 454 stored in memory 405.

The set of E-DPCCH orders utilized to alter the downlink MIMO configuration (e.g., stored in the listing of E-DPCCH orders 454) may take several different forms within the scope of the present disclosure. For example, one order may be used to indicate turning off MIMO, while another order may be used to indicate turning on MIMO. In another example, a single order may be used to toggle between an on and off configuration. In still another example, each utilized E-DPCCH order may represent a desired MIMO configuration (e.g., no MIMO, single stream beamforming, 2×MIMO, 4×MIMO).

Here, the Node B 108 may additionally be configured to decode one or more E-DPCCH orders utilized by the UE 110, wherein the E-DPCCH orders are configured for altering the downlink MIMO configuration, e.g., by turning on or off the MIMO transmission, or to switch between MIMO configurations (e.g., single stream beamforming, 2×MIMO, and 4×MIMO).

By utilizing this scheme, the UE 110 may decide, based on any suitable factors or parameters, the best downlink MIMO configuration to choose. For example, the UE 110 may utilize a MIMO determination circuit 442, and/or MIMO determination instructions 462, to determine one or more factors or parameters relating to the downlink MIMO configuration. For example, such factors or parameters for determining a desired MIMO configuration may include, but are not limited to, observations of the channel, observations of signal strength or data errors at one or more of the antennas 403, etc. That is, as indicated above, the use of MIMO may be ill advised when the UE 110 is fast-moving, and accordingly, the MIMO determination circuit 442 and/or MIMO determination instructions 462 may determine, in accordance with information relating to the speed or velocity of the UE 110, to turn off the downlink MIMO configuration. Furthermore, as indicated above, a 2×MIMO configuration, or even a beamforming configuration, may be ill advised if one of two receive antennas 403 is blocked. Similarly, a 4×MIMO configuration may be ill advised if any of one or more of four receive antennas 403 is blocked. Thus, the MIMO determination circuit 442 may determine, in accordance with a detection that one or more antennas is blocked, to alter a MIMO configuration (e.g., to downgrade from 4×MIMO to 2×MIMO or to beamforming, or to downgrade from 2×MIMO to beamforming, or to end a MIMO configuration and request non-MIMO transmissions.

That is, based on any suitable observations/factors/parameters, the UE 110 may determine a desired MIMO configuration, or determine a change in a MIMO configuration, and accordingly select a corresponding E-DPCCH order from a listing 454 of E-DPCCH orders in memory 405, for a subsequent E-DPCCH transmission. In this way, the Node B 108 may determine how to construct a packet for a downlink transmission.

Where E-DPCCH orders are utilized to alter the downlink MIMO configuration, there may be a nonzero amount of signaling overhead taken up. That is, if such an E-DPCCH order is utilized in a particular TTI, then it may not be possible to transmit data on the E-DPDCH. If data were transmitted on the E-DPDCH, then the E-DPCCH codeword would be utilized to indicate the data rate/packet format of the E-DPDCH. However, if the E-DPCCH is occupied with an E-DPCCH order as described herein corresponding to the downlink MIMO configuration, then the corresponding E-DPDCH transmission during that TTI may be empty, representing an overhead cost.

In another aspect of the disclosure, these E-DPCCH orders may be utilized by the UE 110 to indicate that requests to alter the downlink MIMO configuration, as described above, may be carried utilizing the extended codeword set in the CQI/PCI feedback carried on the HS-DPCCH (described above). That is, the UE 110 may be configured to transmit, on the E-DPCCH, an indication that requests to alter the downlink MIMO configuration by utilizing certain CQI/PCI codewords on the HS-DPCCH. Here, the E-DPCCH order may be acknowledged utilizing a suitable ACK/NAK message transmitted by the Node B 108, and further, the timing relationship between such an E-DPCCH order and HS-DPCCH may be any suitable timing relationship, and may be coordinated between the UE 110 and the Node B 108.

MC-HSDPA

As discussed above, multi-carrier downlink transmissions (e.g., DC-HSDPA or, more broadly, MC-HSDPA) provides for downlink carrier aggregation. The carrier aggregation achieved in 3GPP Release 8 DC-HSDPA and its subsequent enhancements for more than two downlink carriers provides benefits in terms of user experience, including latency reduction for bursty traffic.

In accordance with an aspect of the disclosure, CQI/PCI codewords and/or E-DPCCH orders may be utilized for each of the two or more carriers utilizing MIMO in an MC-HSDPA system configured for downlink MIMO.

For example, when utilizing CQI/PCI codewords to alter the downlink MIMO configuration, the expanded codeword set for switching on/off MIMO in a single carrier by utilizing PCI/CQI transmissions, e.g., on the HS-DPCCH, may be applied equivalently for each of the two or more carriers in an MC-HSDPA system configured for MIMO on each of two or more carriers. Similarly, E-DPCCH orders may be configured to indicate a UE preference to alter the MIMO configuration for each of two or more carriers, in the same or similar way as described above for a single downlink carrier.

Antenna Selection

In a further aspect of the disclosure, the enlarged PCI/CQI codeword set 452, and/or the set of E-DPCCH orders 454, may include an antenna selection indicator. That is, based on one or more characteristics of each antenna at the Node B, there may be a subset of the downlink transmission antennas that have more favorable characteristics for the downlink transmission. Thus, in the case of a Node B 108 with greater than two antennas, when a downlink MIMO transmission is being transmitted by the Node B 108, based on suitable measurements made by the UE 110 (e.g., corresponding to the channel characteristics, the signal strength, the bit error rate, the phase difference between the respective streams, or any suitable factor), the UE 110 may transmit an antenna selection indicator configured to request a selected subset (e.g., two, four, or any suitable number) of antennas for transmitting the downlink MIMO transmission.

In another aspect of the disclosure, the antenna selection indicator transmitted by the UE 110 may be carried on the E-DPCCH, e.g., as an E-DPCCH order explicitly selecting a subset of identified antennas for the downlink MIMO transmission. Further, by utilizing explicit instructions on an E-DPCCH order, any suitable instruction may be transmitted by the UE, including but not limited to: no beamforming; 2×MIMO; 4×MIMO; a set of orders to indicate to change in the order of MIMO (e.g., 4× to 2×, 2× to 4×, 2× to no MIMO, etc.). In this way, any desired downlink MIMO configuration may be explicitly requested by the UE 110.

In another aspect of the disclosure, the antenna selection indicator transmitted by the UE 110 may indicate a subset of receive antennas 403 at the UE 110 that the UE 110 desires to utilize to receive the downlink MIMO (or non-MIMO) transmission. That is, in addition to or instead of the antenna selection indicator being configured to indicate which antenna(s) the Node B 108 should use to transmit the downlink, in this example, the antenna selection indicator may be configured to indicate which antenna(s) 403 the UE 110 should use to receive the downlink. Here, the selection of which antenna or antennas the UE 110 should utilize to receive the downlink may be performed by the antenna selection circuit 448 and/or antenna selection instructions 468, in accordance with measurements of respective antennas 403 made, e.g., utilizing MIMO determination circuit 442 and/or MIMO determination instructions 462 in coordination with the transceiver 410.

As illustrated in FIG. 4, one example having four antennas 403 has been described herein above. However, this is a nonlimiting example, and within the scope of the present disclosure, the UE 110 may include two, four, or any other suitable number of antennas, greater or lesser than four, within the scope of the present disclosure. Here, an antenna selection indicator may be configured to select between any subset of the available antennas, to any other subset of the available antennas, from one antenna to all available antennas.

Figure 5:
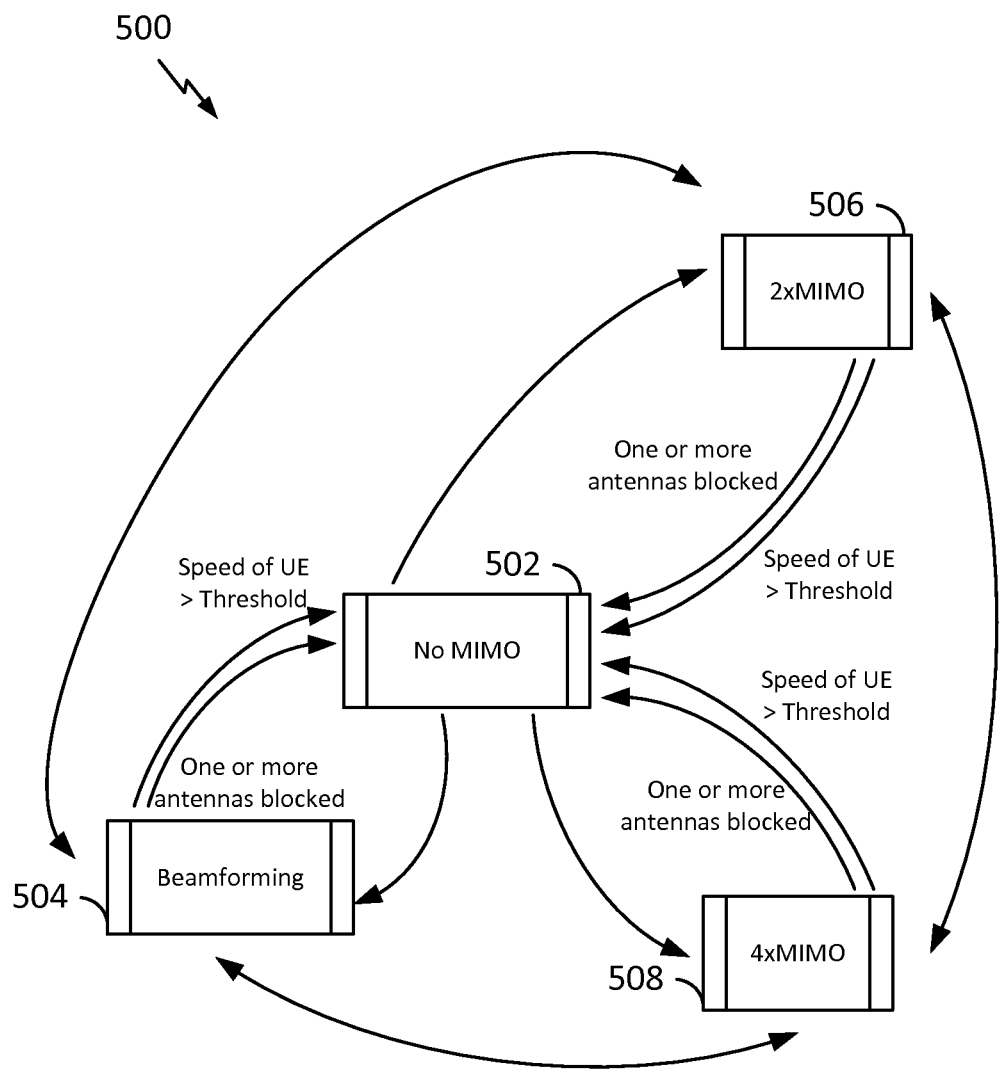
FIG. 5 is a state diagram illustrating state transitions for a UE in different downlink MIMO configurations in accordance with one example.

FIG. 5 is a state diagram 500 illustrating an exemplary set of downlink MIMO states that the UE 110 may be within, in accordance with various aspects of the present disclosure. As described above, by utilizing transmissions such as selected CQI/PCI codewords and/or E-DPCCH orders, the UE 110 may transmit a request to transition from one of the illustrated states, to another one of the illustrated states.

As illustrated, four states are shown: a "No MIMO" state 502, a "Beamforming" state 504, a "2×MIMO" state 506, and a "4×MIMO" state 508. Of course, this is a nonlimiting example, and within the scope of the present disclosure, a greater or lesser number of states may be utilized by any particular UE.

The No MIMO state 502 corresponds to a state wherein the UE 110 receives a single-stream transmission corresponding to the use of a single antenna. The Beamforming state 504 corresponds to a state wherein the UE 110 receives a single-stream beamforming transmission. The 2×MIMO state 506 corresponds to a state wherein the UE 110 receives a 2×MIMO transmission utilizing two antennas. The 4×MIMO state 508 corresponds to a state wherein the UE 110 receives a 4×MIMO transmission utilizing four antennas.

In any of the states 502, 504, 506, or 508, the UE 110 may be configured to utilize any or all of the antennas 403 available to the UE 110. For example, in the No MIMO state 502 and the Beamforming state 504, the UE 110 may be configured to utilize a single antenna from among a plurality of antennas 403. Here, the selection of which antenna to utilize may be made by an antenna selection circuit 448 and/or antenna selection operations 468, e.g., corresponding to measurements of signal characteristics for each of the available antennas and a selection of the best antenna at a particular time. In other examples, the selected antenna may be a default antenna without such measurements, or any other suitable algorithm may be utilized to select an antenna.

Similarly, in the 2×MIMO state 506, the two antennas utilized may be the only antennas 403 available in a particular UE 110; or, in other examples, may be a subset of a larger number of available antennas 403. For example, a particular UE 110 may be capable of 4×MIMO, but for reasons that may correspond to signal conditions, network capacity, or other reasons, this UE 110 may be in the 2×MIMO state 506. Further, in the 4×MIMO state 508, the four antennas utilized may be the only antennas 403 available in a particular UE 110, or, in other examples, may be a subset of a larger number of available antennas 403. Here, the selection of which antennas to utilize may be made by the antenna selection circuit 448 and/or antenna selection operations 468, e.g., corresponding to measurements of signal characteristics for each of the available antennas and a selection of the best antennas at a particular time. In other examples, the selected antennas may be default antennas without such measurements, or any other suitable algorithm may be utilized to select a subset of antennas.

As illustrated in the state diagram 500, the UE 110 may transition between any two states in accordance with a determination that one or more conditions exist. For example, a downgrade of sorts, e.g., from the 4×MIMO state 508 to any of the 2×MIMO state 506, the Beamforming state 504, or the No MIMO state 502, may occur when the UE 110 detects that one or more antennas is (are) blocked, or when the UE 110 detects that the speed of the UE 110 is greater than a suitable threshold. Similar downgrades of the MIMO configuration may occur from the 2×MIMO state 506 to either the beamforming state 504 or the No MIMO state 502; or from the Beamforming state 504 to the No MIMO state 502. Further, as illustrated in the state diagram 500, an upgrade to a higher MIMO state may occur for any suitable reason, as determined by the UE 110. To implement any of the state transitions illustrated in the state diagram of FIG. 5, the UE 110 may utilize the expanded CQI/PCI codeword set described above, or in other examples, may utilize suitable E-DPCCH orders as described above.

Figure 6:
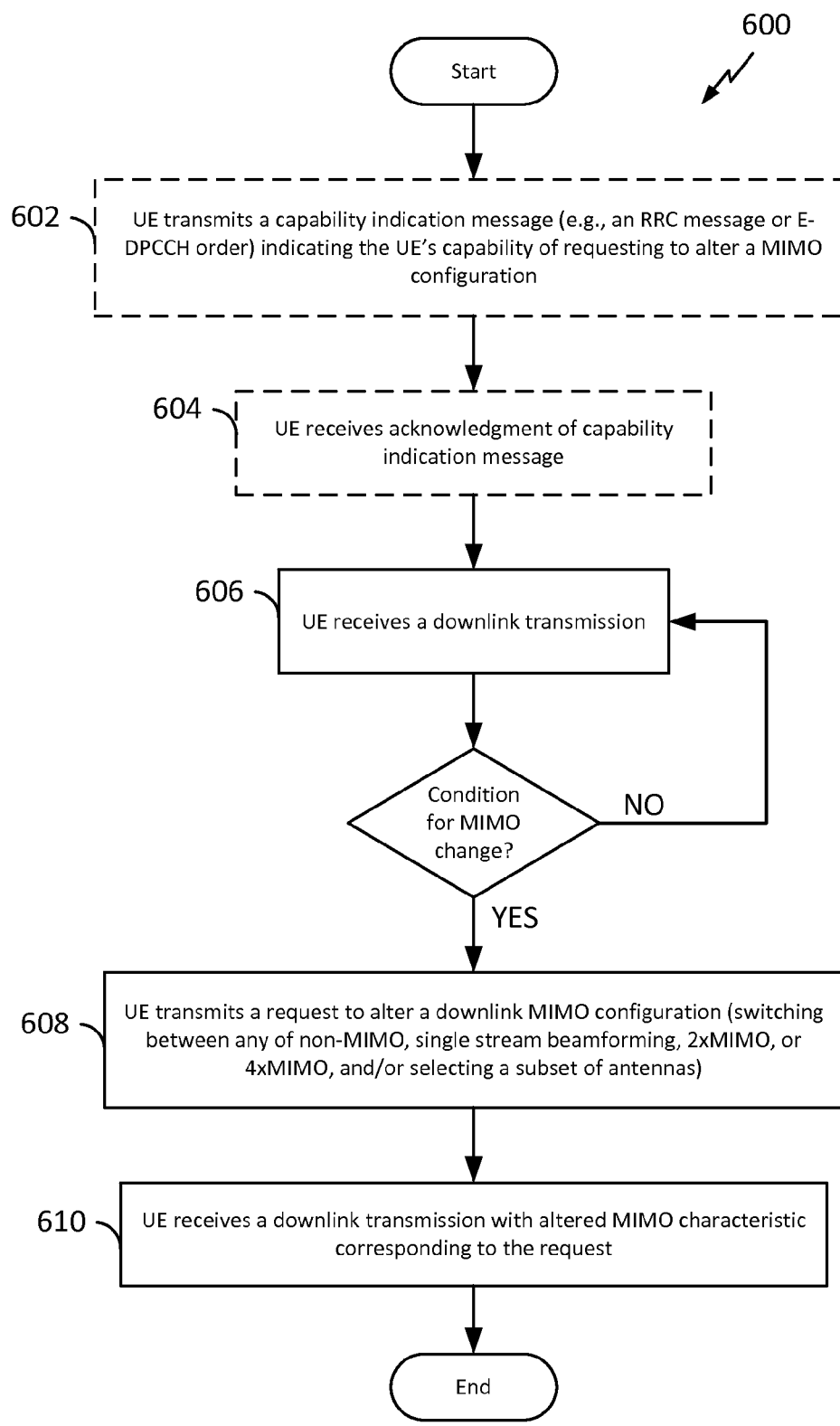
FIG. 6 is a flow chart illustrating a process of dynamically altering a downlink MIMO configuration in accordance with one example.

FIG. 6 is a flow chart illustrating an exemplary process 600 for dynamically altering a downlink MIMO configuration in accordance with one or more aspects of the present disclosure. In some examples, the process 600 may be implemented by the UE 110 described above and illustrated in FIGS. 1 and 4. In some examples, the process 600 may be implemented by the processor 404. In some examples, the process 600 may be implemented by any suitable apparatus or means for carrying out the described functions.

In the illustrated exemplary process 600, at block 602 the UE 110 may optionally transmit a suitable capability indication message indicating the UE's capability of requesting to alter a downlink MIMO configuration, e.g., to request that MIMO be turned off; or to request any suitable change in the downlink MIMO configuration. In one example, the capability indication message may take the form of a suitably configured information element (IE) carried on an RRC message. In another example, the capability indication message may take the form of a suitable configured IE carried on an E-DPCCH order. In other examples, such a capability indication message may be unused, such as in a network wherein such capabilities are assumed, or in other examples, wherein such capabilities are proprietary and generally hidden from standardized signaling, pre-agreed between the UE 110 and the network.

At block 604, the network (e.g., the RNC 106) may transmit an acknowledgment of the capability indication message transmitted from the UE 110 in block 602. This acknowledgment may take any suitable form, including but not limited to an IE carried on an RRC message transmitted on one or more downlink channels. Such an acknowledgment message may be omitted in examples where the UE 110 does or does not transmit the capability indication message described above.

At block 606, the UE 110 may receive a downlink transmission, which may or may not be a MIMO transmission. That is, at block 606, the UE 110 may operate in any one of the states described above and illustrated in the state diagram 500 of FIG. 5. Here, the UE 110 may utilize suitable channel measurement circuitry to determine one or more channel characteristics, such as a signal strength, error rate, etc., corresponding to one antenna, to a subset of antennas, or to all antennas 403 at the UE 110. In addition, or alternatively, the UE 110 may utilize any suitable means to determine its speed or velocity, such as GPS circuitry, radio channel measurement circuitry, or information transmitted to the UE 110 from another apparatus configured to determine the speed or velocity of the UE 110. In accordance with this or other suitable information, the MIMO determination circuit 442 and/or the MIMO determination instructions 462 may determine whether a condition for a change or alteration in the downlink MIMO configuration exists, including but not limited to determining that the speed of the UE 110 is greater than a threshold, or determining that one or more of the antennas of the UE 110 are shadowed or blocked.

If no such condition exists, then the process may return to block 606, wherein the UE 110 may simply continue normal operations utilizing its current configuration. However, if a condition such that the UE 110 may desire to request an alteration in its downlink MIMO configuration exists, then the process may proceed to block 608, wherein the UE 110 may transmit a request to alter its downlink MIMO configuration, e.g., to transition between any of a non-MIMO state, a single stream beamforming state, a 2×MIMO state, a 4×MIMO state, or any other downlink MIMO state. Furthermore, in some examples, the transmitted request to alter the downlink MIMO configuration may additionally or alternatively include information selecting a subset of antennas for receiving (or, in some examples, transmitting from the Node B) the downlink MIMO transmission.

In response, at block 610, the UE 110 may receive a downlink transmission with altered MIMO characteristics, corresponding to the request transmitted in block 608. That is, in accordance with an aspect of the disclosure, by virtue of the UE transmission of a request to alter the downlink MIMO configuration, the network may respond with a corresponding MIMO transmission as requested by the UE 110.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment (UE), comprising:
   determining to alter a first multi-input multi-output (MIMO) configuration of a downlink transmission based on at least one of a speed of the UE or a detection that one or more antennas of the UE are blocked;
   transmitting, from the UE, a capability indication message configured to indicate a capability of requesting to alter a downlink MIMO configuration, wherein the capability indication message comprises an information element (IE) carried on one of a radio resource control (RRC) protocol message or an enhanced uplink dedicated physical control channel (E-DPCCH) order;
   transmitting a request to alter the first MIMO configuration of the downlink transmission, wherein the request is transmitted based on the determination to alter the first MIMO configuration; and
   receiving the downlink transmission based on a second MIMO configuration corresponding to the request.

2. The method of claim 1, wherein the request is transmitted on a high-speed dedicated physical control channel (HS-DPCCH) utilizing a codeword corresponding to a set of codewords, the set of codewords comprising channel quality information and/or precoding information (CQI/PCI) reporting information.

3. The method of claim 1, wherein the request is transmitted on an enhanced uplink dedicated physical control channel (E-DPCCH).

4. The method of claim 1, further comprising:
   determining, in accordance with information relating to a speed or velocity of the UE, to request a turning off of the first MIMO configuration,
   wherein the request to alter the first MIMO configuration is configured to request the turning off of the first MIMO configuration.

5. The method of claim 1, further comprising:
   determining, in accordance with a detection that one or more antennas of the UE are blocked, to alter the first MIMO configuration.

6. The method of claim 5, wherein the request to alter the first MIMO configuration is configured to indicate a selected subset from among a plurality of antennas at a base station for transmitting the downlink transmission.

7. A user equipment (UE) configured for wireless communication, comprising:
   at least one processor;
   a memory communicatively coupled to the at least one processor; and
   a transceiver communicatively coupled to the at least one processor,
   wherein the at least one processor is configured to:
   determine to alter a first multi-input multi-output (MIMO) configuration of a downlink transmission based on at least one of a speed of the UE or a detection that one or more antennas of the UE are blocked;
   transmit a capability indication message configured to indicate a capability of requesting to alter a downlink MIMO configuration, wherein the capability indication message comprises an information element (IE) carried on one of a radio resource control (RRC) protocol message or an enhanced uplink dedicated physical control channel (E-DPCCH) order;
   transmit a request to alter the first MIMO configuration of the downlink transmission, wherein the request is transmitted based on the determination to alter the first MIMO configuration; and
   receive the downlink transmission based on a second MIMO configuration corresponding to the request.

8. The UE of claim 7, wherein the request is transmitted on a high-speed dedicated physical control channel (HS-DPCCH) utilizing a codeword corresponding to a set of codewords, the set of codewords comprising channel quality information and/or precoding information (CQI/PCI) reporting information.

9. The UE of claim 7, wherein the request is transmitted on an enhanced uplink dedicated physical control channel (E-DPCCH).

10. The UE of claim 7, wherein the at least one processor is further configured to determine, in accordance with information relating to a speed or velocity of the UE, to request a turning off of the first MIMO configuration,
    wherein the request to alter the first MIMO configuration is configured to request the turning off of the first MIMO configuration.

11. The UE of claim 7, wherein the at least one processor is further configured to determine, in accordance with a detection that one or more antennas of the UE are blocked, to alter the first MIMO configuration.

12. The UE of claim 11, wherein the request to alter the first MIMO configuration is configured to indicate a selected subset from among a plurality of antennas at a base station for transmitting the downlink transmission.

13. A user equipment (UE) configured for wireless communication, comprising:
    means for determining to alter a first multi-input multi-output (MIMO) configuration of a downlink transmission based on at least one of a speed of the UE or a detection that one or more antennas of the UE are blocked;
    means for transmitting a capability indication message configured to indicate a capability of requesting to alter a downlink MIMO configuration, wherein the capability indication message comprises an information element (IE) carried on one of a radio resource control (RRC) protocol message or an enhanced uplink dedicated physical control channel (E-DPCCH) order;
    means for transmitting a request to alter the first MIMO configuration of the downlink transmission, wherein the request is transmitted based on the determination to alter the first MIMO configuration; and means for receiving the downlink transmission based on a second MIMO configuration corresponding to the request.

14. The UE of claim 13, wherein the request is transmitted on a high-speed dedicated physical control channel (HS-DPCCH) utilizing a codeword corresponding to a set of codewords, the set of codewords comprising channel quality information and/or precoding information (CQI/PCI) reporting information.

15. The UE of claim 13, wherein the request is transmitted on an enhanced uplink dedicated physical control channel (E-DPCCH).

16. A non-transitory computer-readable storage medium comprising instructions for causing a computer to:
   determine to alter a first multi-input multi-output (MIMO) configuration of a downlink transmission based on at least one of a speed of the computer or a detection that one or more antennas of the computer are blocked;
   transmit, from the computer, a capability indication message configured to indicate a capability of requesting to alter a downlink MIMO configuration, wherein the capability indication message comprises an information element (IE) carried on one of a radio resource control (RRC) protocol message or an enhanced uplink dedicated physical control channel (E-DPCCH) order;
   transmit a request to alter the first MIMO configuration of the downlink transmission, wherein the request is transmitted based on the determination to alter the first MIMO configuration; and
   receive the downlink transmission based on a second MIMO configuration corresponding to the request.

17. The non-transitory computer-readable storage medium of claim 16, wherein the request is transmitted on a high-speed dedicated physical control channel (HS-DPCCH) utilizing a codeword corresponding to a set of codewords, the set of codewords comprising channel quality information and/or precoding information (CQI/PCI) reporting information.

18. The non-transitory computer-readable storage medium of claim 16, wherein the request is transmitted on an enhanced uplink dedicated physical control channel (E-DPCCH).

* * * * *